United States Patent [19]

Hantelmann

[11] 4,144,441

[45] Mar. 13, 1979

[54] ELECTRODE METHOD FOR WELDING THIN STEEL SHEETS

[75] Inventor: Paul Hantelmann, Darmstadt, Fed. Rep. of Germany

[73] Assignee: Messer Griesheim GmbH, Frankfurt am Main, Fed. Rep. of Germany

[21] Appl. No.: 862,340

[22] Filed: Dec. 20, 1977

[30] Foreign Application Priority Data

Dec. 22, 1976 [DE] Fed. Rep. of Germany ....... 2658053

[51] Int. Cl.² .............................................. B23K 35/30
[52] U.S. Cl. .................................. 219/74; 219/146.1; 219/146.22; 219/146.23
[58] Field of Search .............. 75/159, 161; 219/146.1, 219/146.21, 146.22, 146.23, 146.3, 146.31, 146.32, 146.41, 74

[56] References Cited

U.S. PATENT DOCUMENTS

| | | | |
|---|---|---|---|
| 1,840,921 | 1/1932 | Spence | 75/161 X |
| 1,966,260 | 7/1934 | Munson | 219/146.22 X |
| 2,012,450 | 9/1935 | Hook | 219/146.22 |
| 2,234,552 | 3/1941 | Dean | 75/161 X |
| 2,238,392 | 4/1941 | Matush | 219/146.22 X |
| 2,407,995 | 9/1946 | Moyer | 75/161 X |
| 2,463,096 | 3/1949 | Garriot | 219/146.22 X |
| 2,797,300 | 6/1957 | Hawthorne | 219/74 |
| 2,929,912 | 3/1960 | Lesnewich | 219/74 |
| 3,198,609 | 8/1965 | Cape | 75/159 X |
| 3,359,084 | 12/1967 | Cape | 75/161 X |
| 3,527,916 | 9/1970 | Ebert | 219/74 |

*Primary Examiner*—Richard R. Kucia
*Attorney, Agent, or Firm*—Connolly and Hutz

[57] ABSTRACT

An electrode method for welding thin steel sheets using the MIG and/or MAG welding process is made from a copper-manganese alloy with 3-35% Mn, 0-15% Ni, 0.02-0.7% Si and the remainder copper.

5 Claims, No Drawings

ELECTRODE METHOD FOR WELDING THIN STEEL SHEETS

BACKGROUND OF THE INVENTION

The invention relates to the electrode method for welding thin steel sheets, using the MIG (metal inert gas) -and/or the MAG (metal active gas) -welding process.

For welding thin steel sheets, as for example, autobody parts, the MIG- of MAG-welding process with steel-wire electrodes is used. However, disadvantages arise in doing so.

In welding an I-joint using the MAG-welding process with steel-wire electrodes, a high heat yield disadvantageously occurs, with a resulting strong distortion of the sheets to be welded to one another.

The already used MIG-method for welding steel sheets with S-Cu Al 8 or S-Cu Sn-electrodes gives only partially good results. By using S-Cu Al 8 there also is the disadvantage that a finishing of the welding seam with hard solder fails, because of its poor flow properties on the welding material.

By using S-Cu Sn-electrodes there is the danger of solder cracks.

SUMMARY OF THE INVENTION

Proceeding from this state of the art, the object of the present invention is to create an electrode for welding thin steel sheets according to the MIG- or MAG-process, that does away with the above mentioned welding defects and makes it possible to weld economically. This is done by forming the electrode from a copper-manganese alloy.

DETAILED DESCRIPTION

To accomplish the above object it is proposed according to the invention that the electrodes consist of a Cu-Mn-alloy with 3.35% 3–350–15% Ni, 0.02–0.7% Si and the rest Cu.

A preferred composition of the electrode according to a further proposal of the invention consists of 6–30% Mn, 0–10% Ni, 0.05–0.5% Si and the rest Cu.

The electrode, according to the invention, is especially suitable for the MAG-welding process, where carbon dioxide is advantageously used as a protective gas. By using the invention's electrode there occur, advantageously no difficulties with an eventual soldering afterwards.

Furthermore, by welding with the invention's electrode, there results a smoother welding cycle and even at a higher burn penetration, there is no tendency towards solder cracks. Finally, welding with this electrode has the advantage that, especially with auto-body sheet metal, no contact corrosion occurs in case of lacquer damage.

What is claimed is:

1. In a method of welding thin steel sheets by the use of the MAG welding process wherein carbon dioxide is used as the protective gas, the improvement being welding the thin steel sheets by means of an electrode made from a copper -manganese alloy made of copper, manganese, nickel and silicon comprising 3–35% Mn, 0–15% Ni, 0.02–0.7% Si, and the remainder being copper to minimize any tendency toward solder cracks and corrosion.

2. In the method of claim 1 wherein the thin steel sheets are auto body parts, including welding an I-joint, and thereafter soldering the welded thin steel sheets.

3. In the method of claim 1 wherein the electrode has a composition of 6–30% Mn, 0–10% Ni; 0.05–0.5% Si, and the remainder being copper.

4. In a method of welding thin steel sheets by the use of the MIG welding process, the improvement being welding the thin steel sheets by means of an electrode made from a copper-manganese alloy made of copper, manganese, nickel and silicon comprising 3–35% Mn, 0–15% Ni, 0.02–0.7% Si, and the remainder being copper.

5. In the method of claim 4 wherein the electrode has a composition of 6–30% Mn, 0–10% Ni, 0.05–0.5% Si, and the remainder being copper.

* * * * *